Patented Aug. 10, 1926.

1,595,549

UNITED STATES PATENT OFFICE.

ALFRED HOLL, OF OFFENBACH-ON-THE-MAIN, GERMANY, ASSIGNOR TO I. G. FARBEN-INDUSTRIE AKTIENGESELLSCHAFT, OF FRANKFORT, GERMANY.

HALOGENATED VAT DYESTUFFS OF THE ANTHRAQUINONE SERIES AND PROCESS OF MAKING SAME.

No Drawing. Application filed June 9, 1925, Serial No. 36,021, and in Germany June 20, 1924.

My invention relates to new halogenated vat dyestuffs of the anthraquinone series, which may be obtained by treating dyestuffs of the pyrazole-anthrone-yellow series, i. e. pyrazole-anthrone-yellow and its N-alkyl- and N-aralkyl-derivatives such as mentioned in the U. S. Letters Patent No. 1,329,435 and the German Letters Patent 359,139, with halogens. Advantageously the halogenation may be conducted while adding iodine and in a strong acid containing $SO_3$, such as oleum or chlorosulfonic acid.

The new dyestuffs are when dry yellow to dark red powders, insoluble in organic solvents, soluble in concentrated sulfuric acid to a bluish red solution, in oleum to a reddish violet solution, yielding with alkaline hydrosulfite a blue vat and dyeing cotton in blue tones, which upon exposure to the air are changed into yellow to bluish red shades of an especial fastness to boiling water. Assuming the correctness of certain data found in scientific literature, these new dyestuffs might be represented by the following general formula:

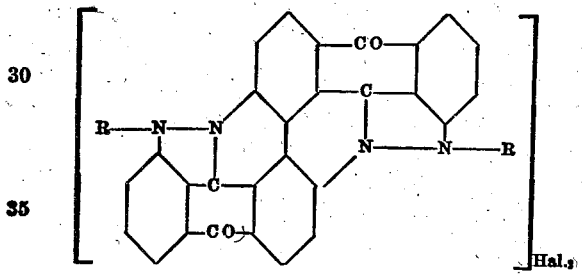

wherein R designates a monovalent radical such as hydrogen or organic radicals.

The chlorinated derivatives of the pyrazole-anthrone-yellow series are the most important bodies of this class. If certain published data are assumed to be correct, such chlorinated derivatives might be represented by the following general formula:

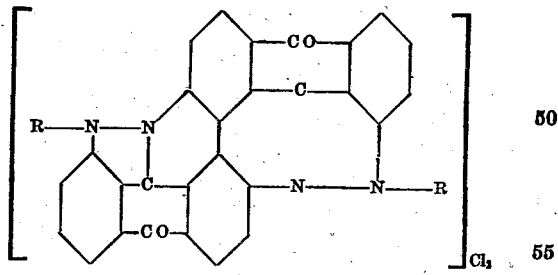

wherein R designates a monovalent radical such as hydrogen or organic radicals.

The following examples illustrate the nature of the invention, the parts being by weight.

*Example 1.*

100 parts of pyrazole-anthrone-yellow are dissolved in 1000 parts of oleum of 25% strength, 0,5 parts of finely powdered iodine are strewn in and at about 50° C. a moderate current of chlorine is introduced for about 12 hours, until the quantity of chlorine, which is sufficient for a dichlorinated derivative, is absorbed. The mass is worked up as usually.

The dichloropyrazole-anthrone-yellow, thus formed, is when dry an orange powder, soluble in sulfuric acid to a red solution. It yields a blue vat and dyes cotton in orange shades of an excellent fastness. This dichloro pyrazole-anthrone-yellow might be represented by the following formula (assuming the correctness of certain data found in scientific literature):

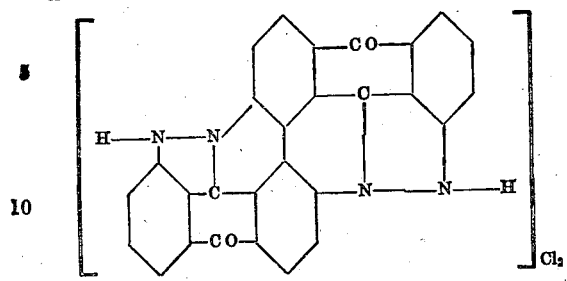

Example 2.

100 parts of the dyestuff, prepared according to example 3 of the U. S. Letters Patent No. 1,329,435 are dissolved in 1000 parts of oleum, containing 20% of $SO_3$. About 0.05 to 0.5 parts of finely powdered iodine are strewn in and at about 50° C. while stirring rapidly a moderate current of chlorine is introduced in the solution, until the quantity of chlorine corresponding to a dichloro-derivative, is absorbed. The chlorinated derivative, thus formed, being probably a dichloro-N-diethylpyrazole-anthrone-yellow, yields from a blue vat a clear bluish red of an excellent fastness upon cotton. This chlorinated derivative might be represented by the following formula (assuming the correctness of certain data found in scientific literature):

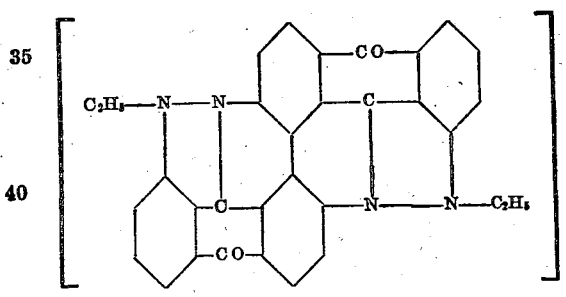

By varying the period of introducing chlorine also other chlorinated derivatives may be obtained. In a similar manner also other dyestuffs of the pyrazole-anthrone-yellow series may be treated with chlorine and bromine.

Now what I claim and desire to secure by Letters Patent is the following:

1. A process of making new halogenated vat dyestuffs of the anthraquinone series consisting in treating dyestuffs of the pyrazole-anthrone-yellow series, mentioned in the U. S. Letters Patent No. 1,329,435 and the German Letters Patent No. 359,139, with halogens.

2. A process of making new halogenated vat dyestuffs of the anthraquinone series consisting in treating dyestuffs of the pyrazole-anthrone-yellow series, mentioned in the U. S. Letters Patent No. 1,329,435 and the German Letters Patent No. 359,139, with halogens while adding iodine and in a strong acid containing $SO_3$.

3. As new articles halogenated vat dyestuffs of the anthraquinone series, which are halogenated derivatives of the dyestuffs of the pyrazole-anthrone-yellow series, mentioned in the U. S. Letters Patent No. 1,329,435 and the German Letters Patent No. 359,139, which halogenated derivatives may perhaps be represented by the general formula

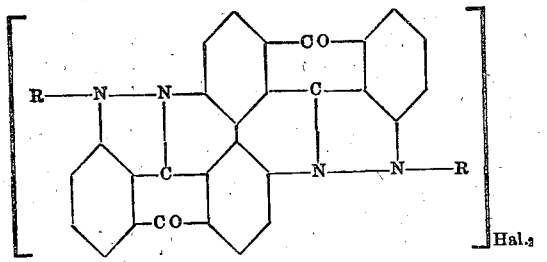

wherein R designates a monovalent radical, and which are when dry yellow to dark red powders, insoluble in organic solvents, soluble in concentrated sulfuric acid to a bluish red solution, in oleum to a reddish violet solution, yielding with alkaline hydrosulfite a blue vat and dyeing cotton in blue tones, which upon exposure to the air are changed into yellow to bluish red shades of an especial fastness to boiling water.

4. A process of making new chlorinated vat dyestuffs of the anthraquinone series consisting in treating dyestuffs of the pyrazole-anthrone-yellow series, mentioned in the U. S. Letters Patent No. 1,329,435 and the German Letters Patent No. 359,139, with chlorine.

5. A process of making new chlorinated vat dyestuffs of the anthraquinone series consisting in treating dyestuffs of the pyrazole-anthrone-yellow series, mentioned in the U. S. Letters Patent No. 1,329,435 and the German Letters Patent No. 359,139, with chlorine while adding iodine and in a strong acid containing $SO_3$.

6. As new articles chlorinated vat dyestuffs of the anthraquinone series, which are chlorinated derivatives of the dyestuffs of the pyrazole-anthrone-yellow series, mentioned in the U. S. Letters Patent No. 1,329,435 and the German Letters Patent No. 359,139, which chlorinated derivatives may perhaps be represented by the general formula

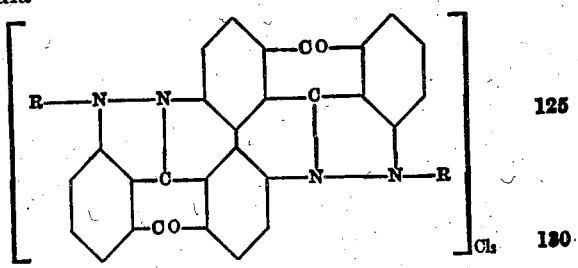

wherein R designates a monovalent radical, and which are when dry yellow to dark red powders, insoluble in organic solvents, soluble in concentrated sulfuric acid to a bluish red solution, in oleum to a reddish violet solution, yielding with alkaline hydrosulfite a blue vat and dyeing cotton in blue tones, which upon exposure to the air are changed into yellow to bluish red shades of an especial fastness to boiling water.

7. A process of making a new chlorinated vat dyestuff of the anthraquinone series, consisting in treating the N-diethylderivative of pyrazole-anthrone-yellow with chlorine.

8. A process of making a new chlorinated vat dyestuff of the anthraquinone series, consisting in treating the N-diethylderivative of pyrazole-anthrone-yellow with chlorine while adding iodine and in a strong acid, containing $SO_3$.

9. As a new article a chlorinated vat dyestuff of the anthraquinone series being probably dichloro-N-diethyl-pyrazole-anthrone-yellow, which may perhaps be represented by the formula

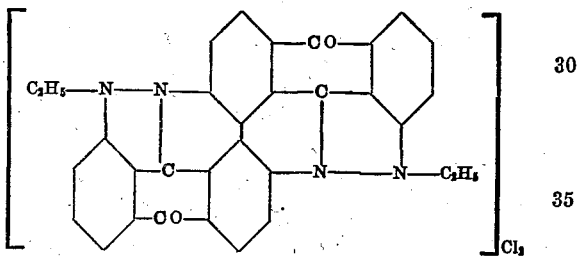

and which is when dry a bluish red powder, insoluble in organic solvents, soluble in concentrated sulfuric acid to a bluish red solution, in oleum to a reddish violet solution, yielding with alkaline hydrosulfite a blue vat and dyeng cotton in blue tones, which upon exposure to the air are changed into a bluish red of an especial fastness to boiling water.

In testimony, that I claim the foregoing as my invention, I have signed my name, this 28th day of May, 1925.

ALFRED HOLL.